3,408,254
2,2'-(1,2-CYCLOBUTYLENE)BIS[4,6-DIAMINO-s-TRIAZINE] AND RESINS FORMED THEREFROM
Janice L. Greene, Warrensville Heights, and Franklin Veatch and Murrel Godfrey, Cleveland, Ohio, assignors to The Standard Oil Company, Cleveland, Ohio, a corporation of Ohio
No Drawing. Filed July 22, 1964, Ser. No. 384,547
5 Claims. (Cl. 161—261)

ABSTRACT OF THE DISCLOSURE

Herein is disclosed a new compound, 2,2'-(1,2-cyclobutylene)bis[4,6-diamino-s-triazine], which is useful in preparing resin compositions. This compound is prepared by reacting 1,2-dicyanocyclobutane either with cyanamide or dicyandiamide.

---

This invention relates to a new compound, 2,2'-(1,2-cyclobutylene)bis[4,6-diamino-s-triazine], (for brevity, referred to hereinafter as 1,2-cyclobutane dicarboguanamine), and to resins formed therefrom.

1,2-cyclobutane dicarboguanamine can be prepared by reacting cis, trans, or mixed isomers of 1,2-dicyanocyclobutane with (I) cyanamide or (II) dicyandiamide, in the presence of ammonia. Reaction II also requires the presence of a basic catalyst. The resulting dicarboguanamine may be represented by the formula:

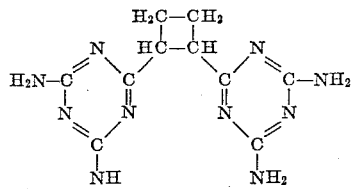

Reaction (I).—1,2-dicyanocyclobutane plus cyanamide

This reaction proceeds at elevated temperature and pressure in the presence of sufficient ammonia to direct the reaction toward guanamine formation. Since the reaction is substantially quantitative, the cyanamide and dinitrile can be used in the stoichiometric (4:1) molar ratio; however, a slight excess of either reactant, up to about a 10% (molar) excess, will increase yields somewhat.

Both the cyanamide and dinitrile are solids at ambient conditions, so their admixture and contact with ammonia are facilitated by the presence of a mutual solvent. For this purpose, lower boiling hydroxylated compounds are useful, and methanol is especially preferred. When used, the solvent should be present in at least that amount which will completely dissolve the reactants. As a rule of thumb for methanol, four times by weight of dinitrile charged is adequate. Large excesses of solvent can be used without interfering with the reaction, bearing in mind that whatever amount of solvent is added, will have to be removed during product recovery.

The amount of ammonia used can vary over wide limits. In general, from about 0.5 to about 10 moles of ammonia per mole of cyanamide is adequate with from about 3.5 to about 6.5 moles of ammonia per mole of cyanamide being preferred.

The reaction can be conducted at temperatures within the range of about 80° C. to about 250° C., and preferably from about 120° C. to about 200° C. Pressures can range from about 30 p.s.i.g. to about 1000 p.s.i.g. and preferably from about 50 p.s.i.g. to about 700 p.s.i.g. Higher temperatures and pressures will shorten the reaction time.

EXAMPLE I

In a 1 liter autoclave equipped with a stirrer and cooling coils were placed 53 g. (0.5 mole) trans-1,2-dicyanocyclobutane, 101 g. (2.2 moles) cyanamide and 250 g. of methanol saturated with 125 g. (7.4 moles) of ammonia. The autoclave was sealed and heated to 160° C. for six hours. The maximum pressure observed during this period was 610 p.s.i.g. Upon being cooled to room temperature, the autoclave was vented and opened, and the contents filtered, washed with water and air-dried to give 130 g. (90% yield) of 1,2-cyclobutane dicarboguanamine-monohydrate. The product had a melting point of 265–270° C. and its identity was established by its infrared spectrum, by its NMR spectrum, by differential thermal analysis, and by thermogravimetric analysis. Further drying in an oven will convert the monohydrate to a somewhat hygroscopic anhydrous dicarboguanamine, melting point 305–307° C.

Reaction (II).—1,2-dicyanocyclobutane plus dicyandiamide

This reaction proceeds at elevated temperature and pressure in the presence of a hydroxylated organic solvent, ammonia and a basic catalyst.

Dicyandiamide and 1,2-dicyanocyclobutane may be reacted in the stoichiometric 2:1 molar ratio, but a slight excess of diamide, say within the range of about 2.1:1 to about 2.5:1 is preferred to ensure a substantially complete reaction and high yields. Greater excesses of diamide should be avoided because of the formation of by-products such as melamine.

The hydroxylated organic solvent is preferably a low-boiling compound, and methanol is particularly suitable. Ammonia should be present in an amount within the range of about 10% to about 50% by weight of hydroxylated solvent and preferably about 30 to about 50 wt. percent. The weight ratio of ammonia plus hydroxylated solvent to dicyandiamide may be within the range of about 0.5:1 to about 2:1.

Examples of suitable catalysts include sodium, potassium, calcium, sodium and potassium hydroxides, sodium and potassium carbonates, sodamide, sodium methoxide, and sodium dicyandiamide. The amount of catalyst required depends variously on its solubility in the solvents used, the relative amounts of ammonia and hydroxylated solvent employed, the temperature and pressure of the reaction, the desired rate of reaction, extent of conversion, etc. With the use of sodium hydroxide, high conversions in comparatively short reaction times may be realized with the use of from about 7 to about 17 mole percent sodium hydroxide based on the dicyandiamide employed.

The reaction can be conducted at temperatures within the range of about 0° C. to about 120° C. and preferably from about 60° C. to about 100° C. Pressures can range from about 30 p.s.i.g. to about 1000 p.s.i.g. and preferably from about 50 p.s.i.g. to about 700 p.s.i.g. Higher temperatures and pressures will shorten the reaction time.

EXAMPLE II

In a stainless steel autoclave was placed 106 g. (1 mole) of 1,2-dicyanocyclobutane, 196 g. (2.33 moles) of dicyandiamide, 14 g. of mixed cis and trans solid sodium hydroxide and 275 ml. of methanol. After pressuring to 55 p.s.i.g. with anhydrous ammonia, the reaction mixture was heated at 90° C.–100° C. for 1½ hours. When cool, the product was removed from the autoclave, filtered, washed with water, and vacuum dried to give 100% yield of anhydrous 1,2-cyclobutane dicarboguanamine having a melting point of 305° C.–307° C. The identity of the product was established by its infra-red spectrum, by its NMR spectrum, by differential thermal analysis, and by thermogravimetric analysis. Elemental analysis of the product gave the following results:

|  | Theoretical | Found |
|---|---|---|
| Percent C | 43.8 | 43.8 |
| Percent H | 5.1 | 5.7 |
| Percent N | 51.1 | 51.9 |
| Mol. wt | 275 | 274 |

Recrystallization of the anhydrous 1,2-cyclobutane dicarboguanamine from water gave 1,2-cyclobutane dicarboguanamine dihydrate, melting point 276° C. The identity of this product was established by infra-red spectrum, by its NMR spectrum, by differential thermal analysis, and by thermogravimetric analysis.

1,2-cyclobutane dicharboguanamine may be reacted with aldehydes and precursors thereof selected from the group consisting of aliphatic, aromatic, and heterocyclic aldehydes, preferably having 1–20 carbon atoms, to produce condensation resins useful as laminating and molding resins, textile treating agents, paper sizes, coatings, adhesives and the like. By way of example only, suitable aldehydes include formaldehyde, acetaldehyde, crotonaldehyde, acrolein, benzaldehyde, and furfural. Suitable aldehyde precursors include paraformaldehyde, trioxymethylene, and paraldehyde. The reaction can be carried out by refluxing the aldehyde with enough dicharboguanamine to provide a —CHO/—NH$_2$ mole ratio within the range of about 1:3 to about 3:1, preferably within the range of about 1:1 to about 2:1, and removing water by vacuum stripping.

EXAMPLE III 10 g. (0.037 mole) of 1,2-cyclobutane dicharboguanamine was refluxed with 12.5 g. of 37% formaldehyde solution (0.155 mole; providing a CH$_2$O/amine mole ratio of 1.05:1) from one hour, giving a clear, colorless solution (65% solids). The water was removed by vacuum stripping to give 16 g. of a clear, viscous, colorless syrup.

EXAMPLE IV 150 g. (0.55 mole) of 1,2-cyclobutane dicarboguanamine was refluxed with 150 g. of water and 175 g. of 37% formaldehyde solution (2.16 moles; providing a CH$_2$O/amine mole ratio of 0.98:1) for two hours, giving a clear, colorless solution (45.3% solids). The water was removed by vacuum stripping to give 196 g. of a clear, viscous, colorless syrup (91.4% yield).

EXAMPLE V 27.4 g. (0.10 mole) of 1,2-cyclobutane dicarboguanamine was refluxed with 16 g. of 37% formaldehyde solution (0.20 mole; providing a CH$_2$O/amine ratio of 1:2) for 24 hours giving a two-phase product. The upper phase was mostly water whereas the lower phase consisted of a white gelatinous material which melted at 95° C. and was insoluble in hot water, cold water or ethanol. This product could be cured to a solid product, M.P. >400° C., when subjected to 200 p.s.i. ram pressure and 328° F. for five minutes.

EXAMPLE VI

A solution was prepared from 100 g. 1,2-cyclobutane dicarboguanamine-formaldehyde resin and a mixture of 100 ml. water and 10 ml. ethanol. (The ethanol was used in order to lower the surface tension and increase the ease of impregnation of laminating paper.) This solution was then used to impregnate five sheets of 4″ x 6″ kraft paper in addition to two decorative sheets and two overlay sheets. These sheets were air-dried overnight and then vacuum-dried at 50° C. for four hours. The sheets were then stacked between polished aluminum foil sheets and polished stainless steel plates. The resulting sandwich was placed in a Carver press between platens preheated to 328° F. and subjected to 10,000 p.s.i. ram pressure (4100 p.s.i. laminating pressure) for three minutes, then cooled and removed from the press. The resulting laminate (decorated on both sides) was hard, glossy and smooth. Shore D hardness (ASTM D1484) was 93 to 98.

EXAMPLE VII

A sheet of 6″ x 6″ x 1/32″ walnut veneer was impregnated with a solution of 1,2-cyclobutane dicarboguanamineformaldehyde resin in water (65% solids content), air-dried for four hours at room temperature followed by vacuum-drying at 50° C. for four hours. A piece of 6″ x 6″ x 3/8″ exterior grade fir plywood was coated on one surface with the resin solution and air-dried at room temperature for two hours. The veneer was then placed on the coated side of the plywood and this block was placed between polished aluminum foil sheets and polished stainless steel plates. The resulting sandwich was placed in a Carver press between platens preheated to 328° F. and subjected to 10,000 p.s.i. ram pressure (4100 p.s.i. laminating pressure) for three minutes. The resulting laminate had a deep high gloss and excellent surface with no warpage apparent. The surface was sanded, and another coat of the resin solution was applied with a brush and allowed to air-dry to room temperature for ten minutes. The laminate was then returned to the press and cured again at 328° F., 4100 p.s.i. laminating pressure for three minutes. The surface again had an excellent gloss and a Shore D hardness of 78.

EXAMPLE VIII 23.4 g. (0.40 mole) of acrolein was added slowly over a 15-minute period to 27.4 g. (0.10 mole) of 1,2-cyclobutane dicarboguanamine contained in 25 ml. of water. The reaction was very exothermic. The mixture was refluxed for two hours, then cooled to room temperature, whereupon a yellow solid crystallized out. This solid was insoluble in water but soluble in hot ethanol. A solution of this solid in 50 ml. hot ethanol was used to impregnate five sheets of 3″ x 3″ kraft paper, two decorative sheets and two overlay sheets. These sheets were air-dried at 25° C. for four hours and then formed into a laminate. Upon curing at 5000 p.s.i. ram pressure and 328° F. for three minutes, the laminate was hard, glossy, clear, and light yellow in color. (Shore D hardness=91.)

EXAMPLE IX 27.4 g. (0.10 mole) of 1,2-cyclobutane dicarboguanamine was refluxed with 65 g. of 37% formaldehyde solution (0.80 mole; providing a CH$_2$O/amine ratio of 2:1) for 24 hours giving a single phase product which formed two phases, however, upon being cooled to room temperature. The upper phase was mostly water whereas the lower phase was a clear resinous material which was soluble in hot water and 50/50 vol. percent aqueous ethanol in all proportions. A clear syrup resulted when 25 ml. of ethanol was added to the original two-phase product. This solution was used to impregnate five sheets of kraft paper (3″ x 3″) in addition to two decorative sheets and two overlay sheets. These sheets were air-dried at 25° C. for four hours then formed into a laminate. Upon curing at 5000 p.s.i. ram pressure and 328° F. for three minutes, the laminate was hard, glossy and clear. (Shore D hardness=92.)

EXAMPLE X 27.4 g. (0.10 mole) of 1,2-cyclobutane dicarboguanamine was refluxed with 100 g. of 37% formaldehyde solution (1.2 moles; providing a CH$_2$O/amine ratio of 3:1) for two hours. At the end of this time a clear fluid solution resulted which was soluble in water or ethanol in all proportions. This solution was used to impregnate five sheets of 3″ x 3″ kraft paper, two decorative sheets and two overlay sheets. These sheets were air-dried at 25° C. for four hours and then formed into a laminate. Upon curing at 500 p.s.i. ram pressure and 328° F. for three minutes, the laminate was hard, glossy and clear. (Shore D hardness=92.)

In surprising contrast to prior art teachings that guanamine-formaldehyde resinous condensates are more hydrophobic than those obtained from melamine (see for instance J. Oil & Colour Chem. Assoc. 40, 1070–1071, 1957), 1,2-cyclobutane dicharboguanamine-formaldehyde resinous condensates are more hydrophilic than those obtained from melamine. This was established by preparing formaldehyde resins from melamine and 1,2-cyclobutane dicarboguanamine at the same time and under the same conditions, and comparing their affinity for water as follows:

EXAMPLE XI

In a first flask was placed 25.2 g. (0.20 mole) melamine and 48.6 g. of 37% formaldehyde solution (0.60 mole $CH_2O$; $CH_2O$/melamine=3.0), while 27.4 g. (0.10 mole) 1,2-cyclobutane dicarboguanamine and 32.5 g. of 37% formaldehyde solution (0.40 mole $CH_2O$; $CH_2O$/1,2-cyclobutane dicarboguanamine=4.0) was placed in a second flank. The pH of both mixtures was 3.5. The melamine-formaldehyde mixture consisted of two phases with the melamine as a solid on the bottom and the formaldehyde as a liquid above it. The 1,2-cyclobutane dicarboguanamine-formaldehyde mixture was a homogeneous paste. The two flasks were heated to reflux temperature (85° C.) simultaneously. After 98 minutes the 1,2-cyclobutane dicarboguanamine had reacted completely to give a clear colorless liquid while melamine required an additional 30 minutes (total time of 128 minutes) for complete reaction. Both flasks were then cooled to room temperature and after 19 hours, the melamine resin was a solid gel while the guanamine resin was a clear viscous liquid of the consistency of honey.

The guanamine resin (65.8% solids) was soluble in cold water down to 49% solids; at 44% solids down to 32% solids, the resin precipitated from cold water but redissolved when heated to about 100° C. in a hot water bath. The melamine resin (58.5% solids) was insoluble under all of these conditions.

Further, the 1,2-cyclobutane dicarboguanamine resin was soluble in all proportions in a 25% ethanol in water solution, whereas the melamine resin was soluble only in the 30–40% solids concentration range. Because of their greater affinity for water, 1,2-cyclobutane dicarboguanamineformaldehyde condensation resins are more versatile and can be used in many coating, impregnating, and laminating applications where melamine and other guanamine resins are unsuitable.

Other resinous condensates can be prepared by reacting 1,2-cyclobutane dicarboguanamine and an aldehyde together with other amino compounds, such as urea, melamine or mixtures thereof.

EXAMPLE XII 1,2-cyclobutane dicarboguanamine (27.4 g., 0.1 mole), urea (4.0 g., 0.067 mole) and 43.3 g. of 37% formaldehyde solution (0.52 mole of $CH_2O$) were mixed and heated at 60° C. for 30 minutes. After 10 minutes complete solution had occurred. The resulting syrup was used immediately to impregnate five sheets of 4″ x 6″ laminating paper, one decorative sheet and one overlay sheet. After air-drying for 18 hours at room temperature, the resin content of the sheets was 39%. The sheets were then stacked between polished aluminum foil sheets and polished stainless steel plates and placed in a Carver press between platens preheated to 328° F. and subjected to 10,000 p.s.i. ram pressure (4100 p.s.i. laminating pressure) for 10 minutes. The resulting laminate was hard and semi-glossy.

We claim:
1. 2,2′ - (1,2 - cyclobutylene)bis[4,6 - diamino - s - triazine]dihydate.
2. 2,2′ - (1,2 - cyclobutylene)bis[4,6 - diamino - s - triazine] monohydrate.
3. Anhydrous 2,2′-(1,2-cyclobutylene)bis]4,6-diamino-s-triazine].
4. A resinous condensate of 2,2′-(1,2-cyclobutylene)-bis[4,6-diamino-s-triazine] and an aldehyde selected from the group consisting of aliphatic, aromatic and heterocyclic aldehydes.
5. A heat cured laminated composition comprising a plurality of bonded laminate impregnated with a condensate of 2,2′-(1,2-cyclobutylene)bis(4,6-diamino-s-triazine) and an aldehyde selected from the group consisting of aliphatic, aromatic and heterocyclic aldehydes.

References Cited

UNITED STATES PATENTS

| 2,623,028 | 12/1952 | Love | 260—39 |
| 2,635,083 | 4/1953 | Cordier | 260—17.3 |

FOREIGN PATENTS 685,840  1/1953  Great Britain.

OTHER REFERENCES

Blais: "Amino Resins," 1957, pp. 22–24, 124–126 and 133–137.

WILLIAM H. SHORT, *Primary Examiner.*

H. SCHAIN, *Assistant Examiner.*